United States Patent [19]
Ancarani Restelli

[11] Patent Number: 5,266,065
[45] Date of Patent: Nov. 30, 1993

[54] AUTOMATED BICYCLE TRANSMISSION

[75] Inventor: Amedeo Ancarani Restelli, Cernusco Lombardone, Italy

[73] Assignee: Societa Italiana Catene Calibrate Regina S.p.A., Milan, Italy

[21] Appl. No.: 977,827

[22] Filed: Nov. 17, 1992

[30] Foreign Application Priority Data

Nov. 18, 1991 [IT] Italy .................. MI91 A 003067

[51] Int. Cl.⁵ .............................................. F16H 9/00
[52] U.S. Cl. ..................................................... 474/78
[58] Field of Search ................ 474/69, 70, 78–81; 74/866

[56] References Cited

U.S. PATENT DOCUMENTS

| | | | |
|---|---|---|---|
| 4,412,828 | 11/1983 | Darby | 474/78 X |
| 4,946,425 | 8/1990 | Buhlmann | 474/80 |
| 5,059,158 | 10/1991 | Bellio et al. | 474/80 X |

Primary Examiner—Thuy M. Bui
Attorney, Agent, or Firm—Stevens, Davis, Miller & Mosher

[57] ABSTRACT

An automated bicycle transmission (10) comprises an actuator (17) for movement into predetermined positions of a sprocket change mechanism member (18) moving to engage a chain (19) for transmission of motion opposite a predetermined sprocket among a plurality of coaxial sprockets of different diameter (20). The actuator is controlled by an electronic control device (11) to which is connected a plurality of sensors including a sensor (1) for detection of bicycle speed, a sensor (13) for longitudinal slope or inclination of the bicycle and optionally a sensor (15) of stress transmitted by the cyclist to the pedals. The electronic device (11) compares values detected by the sensors with ranges of preset values corresponding to the various sprockets and controls engagement of the chain with the sprocket having a range of values including said detected values. There can also be provided a sensor (14) of movement of the pedals enabling operation of the actuator (17) only if the cyclist is pedalling.

12 Claims, 1 Drawing Sheet

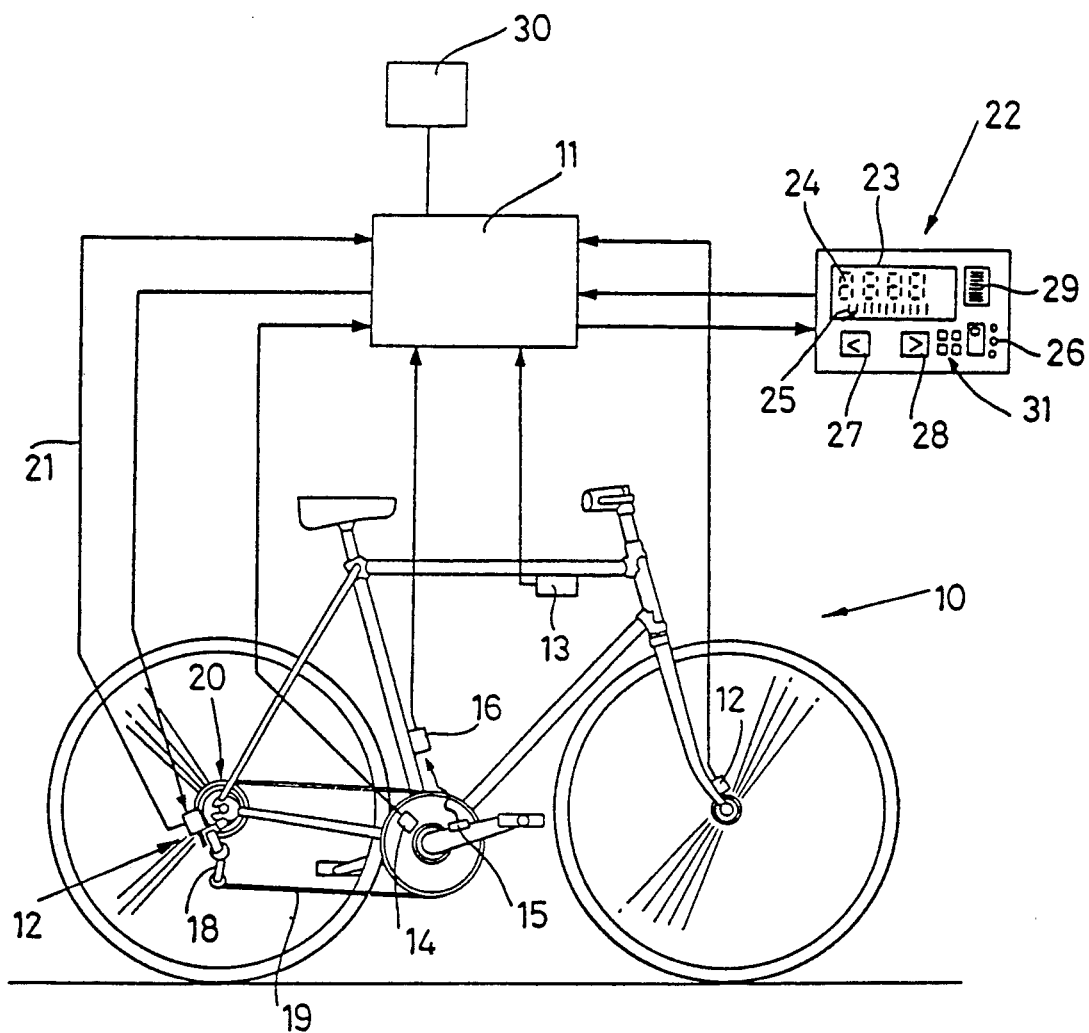

AUTOMATED BICYCLE TRANSMISSION

The present invention relates to an innovative electronic system for control of a speed changer for bicycles. The general purpose of the present invention is to supply a complete and functional system of control of automatic and semiautomatic gear changing for bicycles which would provide optimal performance and selection of the transmission ratio best suited to the running situation of the bicycle.

In view of this purpose it has been sought to provide in accordance with the present invention a motorised transmission for bicycles comprising an actuator of movement into predetermined positions of a sprocket change mechanism member moving for engagement of a motion transmission chain with a predetermined sprocket among a plurality of coaxial sprockets of different diameters connected to a wheel, an electronic device sending movement control signals to the actuator and characterized in that to said electronic device is connected a plurality of sensors including a sensor for detection of the speed of the bicycle and a sensor of slope in the longitudinal direction of the bicycle, the electronic device having means of enablement for comparison of values detected by the sensors with ranges of preset values corresponding to the sprocket currently engaged by the chain and sending control signals to the actuator to engage the chain with a different sprocket of the plurality if such detected values are outside said range of values, said different sprocket being associated with ranges of preset values containing said detected values.

In addition, there can be present another sensor detecting the movement of the pedals and sending to the electronic device a signal of enablement of movement of the actuator when the pedals are being pedalled and a sensor of the value of the stress produced by the cyclist on the pedals. To clarify the explanation of the innovative principles of the present invention and its advantages compared with the known art there is described below with the aid of the annexed drawings a possible embodiment by way of nonlimiting example applying said principles.

With reference to the FIGURE, with a bicycle 10 of the know art is associated an electronic control device 11, e.g. made up of a known microprocessor circuit especially programmed and easily imaginable by those skilled in the art in the light of the description given below and therefore not shown in detail. Electric power can be supplied through accumulators (not shown) optionally charged by means of a solar panel or a dynamo in accordance with the known art.

With said device 11 is connected a plurality of sensors for detection of various parameters of the motion conditions of the bicycle. For example, there are present a tachometric sensor 12 for detection of the bicycle's speed and optionally, through a simple shunt, acceleration, an inclinometric sensor for detection of the slope of the road travelled by the bicycle, a movement sensor 14 for detection of the movement of the pedals, and a sensor 15 of the stress produced on the pedals during pedalling. The various sensors are substantially of known art and are therefore not further described nor shown. The sensor of stress produced on the pedals can be for example an extensometric sensor applied to the connecting rod of the pedal to detect bending, which is proportional to the stress transmitted thereby. In this case the connection between the sensor 15 and the control device 11 can be realised for example by short range radio transmission or equivalent by means of a receiver 16 receiving the values detected and transmitted by the sensor 15 so as to permit free rotation of the pedals without the need for physical connections with the device 11. The device 11 or directly the sensor 15 integrate in time the instantaneous value of the stress detected and which varies with the position of the pedal along its trajectory so as to find the average stress produced in the short term on the pedals.

The device 11 sends control signals to an electromechanical speed change actuator 17, for example commanding for this purpose a sprocket change mechanism 18 for shifting a chain onto a sprocket of a plurality 20 of coaxial sprockets of different diameters.

The actuator 17 can be of any known type suited for shifting of a sprocket change mechanism into various positions relative to the group of sprockets. Particularly advantageous has been found an electromechanical transmission described in a co-pendent application in the name of the same applicant and comprising an electrical motor moving, through a worm and an elastic joint, a parallelogram for support of the sprocket change mechanism 18 for its movement between end positions corresponding to engagement of the chain with end sprockets of the plurality.

To supply feedback to the position of the actuator 17 it sends through a line 21 signals of position to the device 11. For example, such signals can be generated by stops detecting end or intermediate positions of the sprocket change mechanism.

To the electronic device 11 is also connected a control panel 22, advantageously positioned for example on the handlebar of the bicycle and optionally integrated in a single container together with said device 11. The control panel can comprise a display 23, for example of the liquid crystal type, for display of various parameters detected by the sensors or calculated by the device 11, as for example the speed of the bicycle, the slope of the track, the stress generated by the cyclist, the ratio currently inserted, the state of charge of the batteries powering the device, etc. Said indications can be alphanumerical 24 and/or analog 25 and be operated through appropriate keys 31 on the control panel.

The control panel can also comprise an electric switch 26 to turn on the apparatus and select the automatic or semiautomatic transmission procedure as clarified below.

There are also present two keys 27, 28 respectively to make semiautomatic transmissions to lower or higher transmission ratios.

The keys 27, 28 can also be provided near a grip of the handlebar so as to be operable by the cyclist, e.g. with the thumb, without his being forced to release his grip. Lastly, there can be provided an acoustic indicator 29, e.g. to advise the cyclist of the imminence of an automatic change operation.

In use the device can operate essentially in two different modes to be selected by means of the selector 26. In a first operating mode the changes follow in succession fully automatically undr full control of the device 11. To this end the device 11 receives from the sensors the various data detected and uses them to calculate the most suitable transmission ratio. It then commands the actuator 17 to move the chain to the corresponding sprocket. Calculation of the best transmission ratio can be done, for example, by comparison by the control device of tables of acceptable values of the magnitudes detected for the sprocket currently in use with the values actually detected by the sensors. If one of said values detected is outside the acceptable values it commands the actuator to the lower or higher sprocket depending on the sign of the deviation. For example, if the sprocket in use is suited for a range of speeds greater than the speed detected the actuator is commanded to move the chain onto a sprocket of greater diameter. By repeating the procedure for the new sprocket the device decides next whether it will move the chain to another sprocket again and so forth. Similarly, if the parameter which deviates from the range provided for the sprocket in use is the slope of the track or the stress applied by the cyclist on the pedals, the control device passes progressively to sprockets of greater diameter as the slope or stress increases, always comparing the acceptable slope or stress values for a given ratio with the slope values detected by the inclinometer 13 or the stress values detected by the sensor 15 respectively.

The tables with the acceptable values for the various sprockets are memorised in a memory element 30. Said memory element can for example be replaceable and supplied with various series of sprockets installable on the bicycle. In this manner the cyclist when he changes the plurality of sprockets can, by inserting the associated memory, programme the device to perform the correct changes with the new assembly of sprockets.

As an alternative there can be provided a memory 30 programmable by means of keys on the control panel 22 so that the cyclist can instruct the device 11 for a particular operation depending on personal tastes or sprockets mounted or there can be realised various tables to be called up by the cyclist by means of keys associated with the control panel.

The pedalling sensor 14 has the purpose of signalling to the device 11 when it is possible to actually perform the gear ratio change. Indeed, in transmissions with sprocket change mechanisms, passage of the chain from one sprocket to the other is possible only when the cyclist is pedalling. In conventional mechanical transmissions the cyclist pedals when he changes gears by means of the transmission lever. With an automatic transmission as described above the cyclist can however inadvertently suspend pedalling just when the electronic device 11 decides that it is necessary to change gear ratios. The sensor 14 then serves to signal to the control device to wait to perform the change until the cyclist resumes pedalling.

Optionally, this provision can be integrated or replaced by a mechanical system of elastic storage of the movement of the actuator 17 a described in the above mentioned co-pendent patent application on an electromechanical transmission.

In any case, the cyclist can be advised of the imminence or necessity of a change by means of the buzzer 29. If the actuator 17 is not the discrete position type, each position corresponding to a sprocket, but is the type with continuous movement between the various positions corresponding to the sprockets, as for example in the case where said operation comprises a direct current or stepped electric motor with sufficiently small steps, the electronic control device 11 can also use another expedient to facilitate correct passage of the chain among the various sprockets. Said expedient consists of commanding shifting of the sprocket change mechanism until it slightly passes the position corresponding to the sprocket selected and then, after an appropriate delay (fraction of a second), returning the sprocket change mechanism mechanism to the correct position. In this manner engagement of the chain with the sprocket is facilitated.

As mentioned above there is also provided a second operation procedure in which the changes are semiautomatic, i.e. they are required of the device 11 directly by the cyclist by operation of the push buttons 27 and 28. In this case the control device 11 detects all or some of the parameters supplied by the sensors and shows them on the display 23 for the information of the cyclist. For example there can be shown speed and slope. The device does not however use the data of the sensors to perform gear changing. If desired the cyclist can be advised through the display 23 and optionally the buzzer 29 the sprocket which it would be preferable to engage. The actual movement of the transmission takes place only upon manual command of the cyclist who presses the key 27 if he wishes to change to lower ratios and the key 28 if he wishes to change to higher ratios. The device 11 detects these commands and operates accordingly the actuator 17, optionally verifying through the sensor 14 if the pedals are being operated.

At this point it is clear that the initial purpose of supplying a bicycle equipped with a functional automatic or semiautomatic gear changing system has been reached. Naturally the above description of an embodiment applying the innovative principles of the present invention is given merely by way of example and therefore is not to be taken as a limitation of the patent right claimed here. For example, the arrangement and number of controls present on the control panel can vary depending on necessity just as the number, position and type of sensors used can be different. For example, the stress sensor can be provided by positioning appropriate extensometric sensors on the bicycle frame so as to identify and isolate the stress transmitted from the pedals to the frame, a stress which approximates the actual stress produced by the cycle during pedalling.

It would also be possible to use the keys 27, 28 when not used for manual control of gear changing as selectors for the information to be displayed on the display or to select and/or program various functions of the electronic device 11.

I claim:

1. Automatic transmission for bicycles comprising an actuator for movement into predetermined positions of a moving sprocket change mechanism member for engagement of a motion transmission chain opposite a predetermined sprocket among a plurality of coaxial sprockets of different diameters connected to a wheel, an electronic device sending movement control signals to the actuator and characterized in that to said electronic device is connected a plurality of sensors including a sensor for detection of the speed of the bicycle and a sensor of slope in the longitudinal direction of the bicycle, the electronic device having means of enablement for comparison of values detected by the sensors with ranges of preset values corresponding to the sprocket currently engaged by the chain and sending control signals to the actuator to engage with a different sprocket of the plurality if such detected values are outside said range of values and said different sprocket being associated with ranges of preset values including said detected values.

2. Transmission in accordance with claim 1 characterised in that there is present another sensor detecting movement of the pedals and sending to the electronic device a signal of enablement for movement of the actuator when the pedals are moving during pedalling.

3. Transmission in accordance with claim 1 characterised in that the sensors also include a sensor of the stress produced by the cyclist on the pedals.

4. Transmission in accordance with claim 3 characterised in that the stress sensor is a sensor for measurement of the bending of the connecting rod of at least one pedal.

5. Transmission in accordance with claim 4 characterised in that the bending measurement sensor is an extensometric sensor.

6. Transmission in accordance with claim 4 characterised in that the bending measurement sensor transmits the values detected to a receiver connected to the electronic device.

7. Transmission in accordance with claim 1 characterised in that the electronic device includes a memory containing tables of predefined values for comparison constituting said ranges of said preset values.

8. Transmission in accordance with claim 1 characterised in that the comparison enabling means include a manual selector for enablement and disablement of the comparison, upon disablement control keys manually commanding movement of the actuator opposite the sprockets of greater or smaller diameter.

9. Transmission in accordance with claim 1 characterised in that for engagement of the chain with a sprocket the actuator commands the shifting mechanism member to advance by a small amount the predetermined position for said sprocket and, after a pre-set time, commands the shifting member to return to the predetermined position for said sprocket.

10. Transmission in accordance with claim 1 characterised in that the actuator includes a stepped electric motor.

11. Transmission in accordance with claim 1 characterised in that to the electronic control device is connected a display of the values detected by the sensors or the data calculated by the device.

12. Transmission in accordance with claim 1 characterised in that to the electronic control device is connected a sounding device signalling in advance the command of the actuator to engage the chain with a different sprocket.

* * * * *